Figure 1:
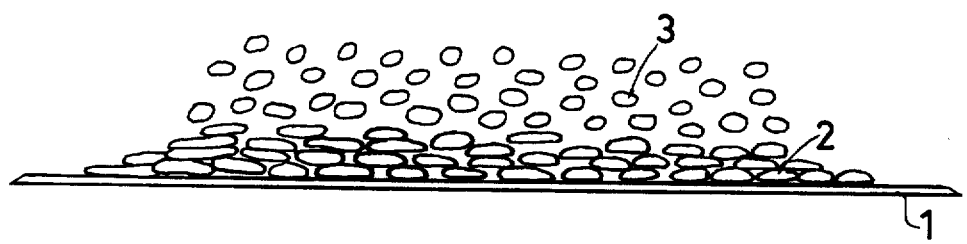

United States Patent [19]
Carmel et al.

[11] 3,891,549
[45] June 24, 1975

[54] METHOD AND AN APPARATUS FOR DEWATERING A SUSPENSION

[75] Inventors: Amichai Meir Carmel, Nynashamn; Bengt Olov Lundh, Hedemora, both of Sweden

[73] Assignee: Rederiaktiebolaget Nordstjernan, Stockholm, Sweden

[22] Filed: Apr. 9, 1973

[21] Appl. No.: 349,360

[30] Foreign Application Priority Data
Apr. 13, 1972 Sweden.............................. 4778/72

[52] U.S. Cl.................... 210/66; 210/77; 210/386; 210/396; 210/400
[51] Int. Cl............................................. B01d 37/04
[58] Field of Search.......................... 210/65–67, 210/383, 386, 396, 400, 401, 77

[56] References Cited
UNITED STATES PATENTS

| | | | |
|---|---|---|---|
| 1,475,244 | 11/1923 | Rolls | 210/386 X |
| 2,097,529 | 11/1937 | Nordell | 210/396 X |
| 2,827,175 | 3/1958 | Cataldo | 210/396 |
| 3,531,404 | 10/1970 | Goodman et al. | 210/400 X |
| 3,692,182 | 9/1972 | patton | 210/386 |

FOREIGN PATENTS OR APPLICATIONS

| | | | |
|---|---|---|---|
| 671,703 | 1/1939 | Germany | 210/396 |
| 893,641 | 10/1953 | Germany | 210/396 |

Primary Examiner—Frank A. Spear, Jr.
Assistant Examiner—Robert G. Mukai
Attorney, Agent, or Firm—Fred Philpitt

[57] ABSTRACT

Method and apparatus for separating a liquid-solid mixture employing a filter means, suction means, a plurality of rotary layer disrupting disks located above the filter and which are positioned to create a plurality of parallel ditches and ridges, and roller means for subsequently smoothing out said ditches and ridges into a layer of uniform thickness.

4 Claims, 5 Drawing Figures

METHOD AND AN APPARATUS FOR DEWATERING A SUSPENSION

Suspensions usually are dewatered on a filter medium, for example on a wire cloth, with or without a suction device beneath the filter. When it is being supplied to the filter, the suspension initially consists of flocks of suspended particles. With continuous movement of the filter medium and continuous supply of the suspension to the filter, a suspension layer on the filter is obtained. It is thereby desired to supply the suspension in such a manner that the layer obtained on the filter is uniform, but in reality the mass is distributed on the filter in an uneven manner, because of, among other reasons, inhomogeneities in the suspension.

As it is a matter of relatively large amounts of liquid passing through the filter, the suspension closest to the filter is dewatered, so that the suspended particles are compacted and render further liquid removal difficult. For many types of suspension which contain so-called compressible material, this implies the formation of a substantially impermeable layer of suspended particles closest to the filter. The suspended particles form tightly upon and after each other, thereby developing a lower compressed layer of suspended particles having a lower liquid content and thereupon a layer with greater porosity consisting of flocks of suspended particles having a higher liquid content.

Attempts have been made in one way or another to improve the liquid removal by pressing, but without appreciable success. The suspension lying above usually flows to the sides.

The present invention has as its object to render the liquid removal from the suspension layer on the filter more efficient. This object is achieved by the method and apparatus according to the invention, which is characterized by the features defined in the attached claims.

According to the invention, the suspension layer is to be ditched, to be turned entirely or partially and to be levelled by being subjected to rotary movement. The ditching is to be carried out so that one or preferably several ditches are formed in close relationship and in parallel transversely through the entire suspension layer. Hereby the lowermost layer of compacted particles is penetrated and the liquid removal — dewatering — is facilitated. It is, however, also important to carry out the ditching so that the lower layer of compacted particles is lifted off the filter medium and placed to the side of the ditches on a higher level relative to the filter medium. The optimum dewatering effect is obtained by turning the suspension layer, which had been in the area of the ditches, entirely upside down and to simultaneously place it to the sides of the ditches in lifted-up portions or ridges, which include a lower untouched compressed layer, an intermediate layer of flocks or porous material and an upper layer of compressed particles.

Thereafter, according to the invention, the suspension again is to be levelled on the filter medium. This levelling preferably also takes place by subjecting the ditched suspension to rotary movement, which preferably is effected by rotating rolls, which so work the ridges that the ditches are re-filled, substantially with the more porous fraction of the suspension. This renders it possible to remove liquid very rapidly also from this part of the layer.

In order to effect a still more efficient liquid removal, the entire treatment of the suspension can be repeated, in such a manner, that the ditches are formed on the filter medium in those places where formerly the ridges were formed.

By the method according to the invention of dewatering a suspension, a very efficient liquid removal is obtained. At tests carried out with a sludge suspension, an increase in water removal by 25 percent was measured.

The invention is described in greater detail in the following, with reference to the accompanying drawings, which illustrate the invention by way of an embodiment.

Figure 2:
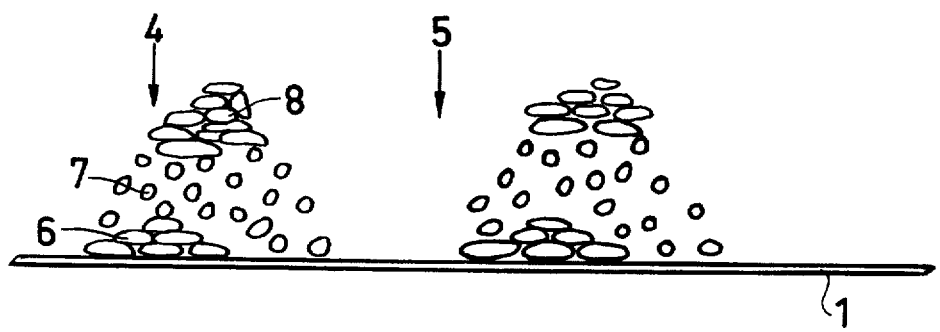
Figure 4:
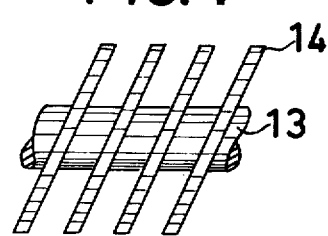
Figure 5:
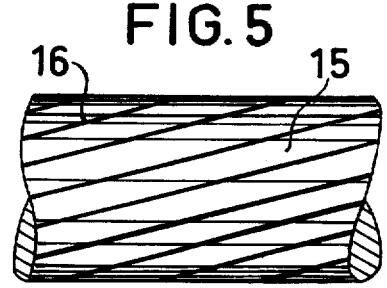
Figure 3:
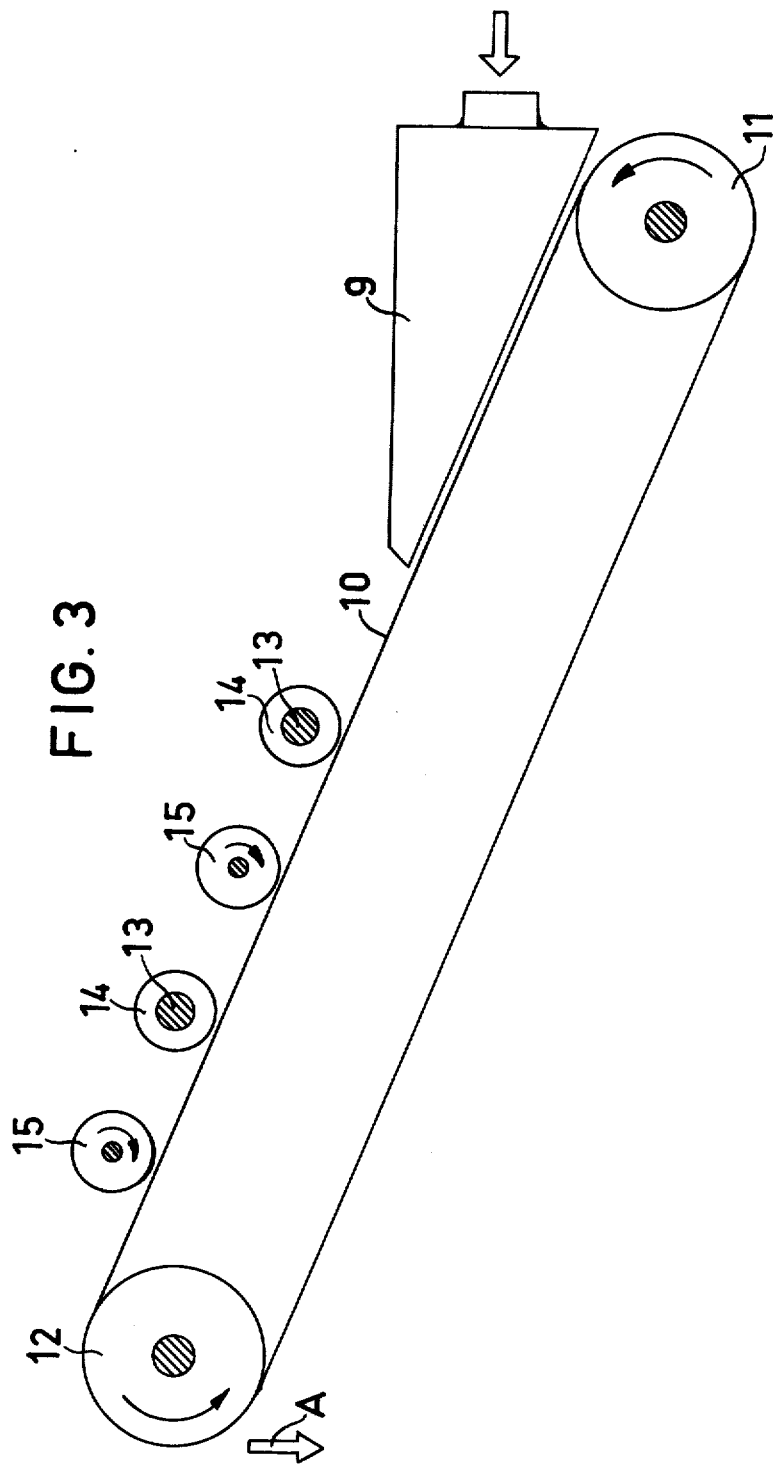

FIG. 1 shows in a schematic way how a suspension is formed when the method according to the invention is not applied, FIG. 2 shows in a schematic way how the suspension is formed when the method according to the invention is applied, FIG. 3 shows an embodiment of an apparatus for carrying out the method according to the invention, FIGS. 4 and 5 show partial views of rotary members comprised in the apparatus.

The known method of dewatering a suspension illustrated in FIG. 1 is not satisfactory. On a filter 1, for example a wire cloth, a compressed and substantially impermeable layer 2 of suspended particles with a low liquid content is formed closest to the filter, and upon said layer 2 a layer 3 with greater porosity is formed of flocks of suspended particles having a higher liquid content. As already mentioned, attempts to improve the liquid removal in one way or another by pressing are not much successful. The suspension layer lying above usually flows to the sides.

FIG. 2 illustrates in a schematic way the condition of the suspension as it is at first obtained at a method according to the present invention. On the filter medium 1, for example a wire cloth, a plurality of lifted-up portions or ridges 4 separated from the ditches 5 are obtained. Said ridges comprise a lower compressed layer 6, which at least substantially is untouched, an intermediate layer 7 of flocks of porous material and an upper layer 8 of compressed particles. Thereafter, according to the method of the invention, the ridges are to be levelled to a layer of substantially uniform thickness. By this levelling, the ridges 4 are affected so that the ditches 5 are re-filled, substantially with the more porous fraction 7 of the suspension. This provides the possibility of a very rapid liquid removal from the suspension. The liquid removal can be rendered still more effective by repeating said procedure, in such a manner, that the ditches then are formed in those places where formerly the ridges 4 were located. In this way also the layer designated by 6 in FIG. 2 is lifted to a higher level.

FIGS. 3–5 show in a somewhat schematic way a preferred embodiment of an apparatus according to the invention for obtaining the aforesaid ditching and levelling effect, only those details of the apparatus being shown which are of interest for understanding the invention.

FIG. 3 shows a box 9 for supplying and distributing a suspension to a wire cloth 10 running endless over pulleys 11 and 12 in the direction indicated by arrows. Two sets of rotary members for ditching and levelling the suspension are shown, of which the first set, seen in the feeding direction of the suspension, comprises flanges or disks 14 mounted in a rotatably supported shaft 13, and the second set is a rotatably suported roll 15. Said disks 14 bring about the ditching and the roll 15 brings about the levelling effect. The treated suspension concentration leaves the wire cloth at the pulley 12 as shown by arrow A.

FIG. 4 shows a portion of the ditching member 13, 14 in a preferred embodiment. The disks 14 are inclined and thereby effect a wavy ditching. The inclined portion of the disks provides the best possibilities for the suspension layer to be lifted and turned at the ditch formation. The disks, however, may also be arranged perpendicularly to the shaft 13. Instead of being straight, as shown, they may also be wave-shaped and thereby form winding ditches in the suspension layer. Straight disks, however, of angular arrangement have proved preferable in most cases. Instead of disks on a rotary shaft, as shown for example in FIG. 4, other rotary members of a suitable shape may be used.

The ditching members, for example 13,14 as shown, shall rotate at a suitable optional speed. It is not suitable to use stationary members, i.e. non-rotary members, because they then act in the same way as gravel-rakes or hay-rakes, which has proved unsuitable as the layer material easily forms clods in the front of the rake. It is, however, of no concern whether the rotary members rotate in the direction of movement of the filter medium and layer or opposed to said direction. At a preferred embodiment, the members rotate opposite to the direction of movement of the layer and thereby bring about a more effective lifting of the layer.

The rolls 15 for levelling the layer are substantially smooth, but preferably provided with small serrations or grooves 16 (FIG. 5) in the surface, which at a preferred embodiment shown in FIG. 5 are placed obliquely to the direction of movement of the filter medium. It is important, furthermore, that the roll when it rotates concurrent with the direction of movement of the filter medium has a circumferential speed exceeding the speed of the filter medium. By this design and mode of operation the layer is prevented from being compressed in a wrong manner, but instead the layer material is moved down into the ditches with a subsequent slight pressing thereagainst. Hereby liquid is removed more rapidly from the material, which previously has held a high liquid content.

It is suitable to arrange the two rotary members 13,14 and, respectively, 15 with resilient contact against the layer, and at a preferred embodiment there is also provided an adjustable controlled contact to the layer (not shown).

A uniform distribution of the suspension over the entire filter medium as it is obtained by the invention can be of a particular value in such cases when the treatment of the suspension is completed as a final step by an extra pressing against the layer. Such a pressing can be applied most simply by attaching a separate strip or a wire wire cloth, which is deflected from above over the end pulley 12 at the apparatus according to FIG. 3 (not shown).

What we claim is:

1. In the known method of separating a mixture of liquid and solid materials by bringing said mixture into contact with a moving filtering means of the endless belt type which permits passage of the liquid but which denies passage to the solids, with the result that due to the compressibility of said mixture a substantially impermeable layer of solids is built upon the filtering means, the improvement which comprises increasing the permeability of said impermeable layer of solids which has built up on the filtering means by:

a. the application of a plurality of spaced disk means, inclined from the vertical and constructed and arranged to create layer-disrupting rotating forces at spaced apart points across the width of said filtering means, each of said rotating disk means penetrating said layer to a point immediately adjacent to the surface of the filtering means in such a manner that the combined action of the rotating disks will be to raise at least some of said impermeable layer laterally up to and above said impermeable layer and in so doing form a plurality of essentially parallel ditches and ridges extending longitudinally with respect to the direction of movement of the moving filtering means, and b. thereafter subjecting said layer with its plurality of longitudinally extending ditches and ridges to a surface leveling means which is constructed and arranged to move the top of each ridge laterally into adjacent ditches and so that the ditches will be eliminated and a layer of substantially uniform thickness produced, thereby increasing the permeability of said layer.

2. A method according to claim 1 wherein following said leveling step (b) the layer is again ditched in the manner of step (a), and then step (b) is repeated following the second ditching step.

3. In the known apparatus for separating a mixture of liquid and solid materials which includes a moving filtering means of endless belt type and a liquid removal means beneath said filtering means that is designed to remove liquid from a liquid-solid mixture deposited on the said filtering means, the improvement which comprises a plurality of rotating disk means which are inclined from the vertical and disposed at spaced apart points above and across the width of said filtering means, all of said inclined disk means being essentially parallel to each other and the lower periphery of each of said disk means extending downwardly to a point adjacent the surface of said filtering means, said disk means being constructed and arranged to rotate such that they will penetrate spaced apart points of any layer of solids that is on the top of the filtering means to a point immediately adjacent to the surface of the filtering means in such a manner that the relatively thicker portion of the layer that is closest to the filtering means will be laterally raised to a higher level relative to the surface of filtering means and in so doing form a plurality of generally parallel ditches and ridges extending longitudinally with respect to the direction of movement of the moving filtering means, and roller levelling means disposed downstream of said plurality of rotating disk means, said roller levelling means being constructed and arranged to move the upper portion of each ridge laterally into adjacent ditches in order to produce a layer of substantially uniform thickness.

4. Apparatus according to claim 3 wherein said roller levelling means has grooves in its surface.

* * * * *